United States Patent [19]

Kehlenbach

[11] Patent Number: 4,921,091
[45] Date of Patent: May 1, 1990

[54] ADJUSTABLE DRAW ROLLER ASSEMBLY

[75] Inventor: Gunther Kehlenbach, Wurselen, Fed. Rep. of Germany

[73] Assignee: H. Krantz GmbH & Co., Wurselen, Fed. Rep. of Germany

[21] Appl. No.: 350,243

[22] Filed: May 11, 1989

[30] Foreign Application Priority Data

May 31, 1988 [DE] Fed. Rep. of Germany ....... 3818409

[51] Int. Cl.$^5$ ............................................. B65G 13/02
[52] U.S. Cl. .................................................. 198/782
[58] Field of Search .................... 198/782; 193/35 SS; 414/535

[56] References Cited

U.S. PATENT DOCUMENTS 3,382,964 5/1968 Bonhoff et al. .................. 198/782 X
4,593,810 6/1986 Cook .............................. 198/782 X

FOREIGN PATENT DOCUMENTS 8602026 3/1988 Netherlands ........................ 414/535

Primary Examiner—Robert J. Spar
Assistant Examiner—Cheryl L. Gastineau
Attorney, Agent, or Firm—Arthur B. Colvin

[57] ABSTRACT

A motorized draw roller assembly includes a draw roller having ends mounted in bearing assemblies vertically shiftably mounted on spaced parallel supports of a frame. A device is provided on one bearing assembly for raising and lowering such bearing assembly in accordance with the direction of rotation of the draw roller shaft, the device including a threaded nut and spaced parallel cables extending from the nut over a pulley, the upper ends of the cables being fixed at an upper portion of the frame. The bearing assembly supporting the other end of the draw roller shaft is caused to shift upwardly and downwardly in precise correlation with the first mentioned bearing assembly by connecting apparatus such as pairs of hydraulic pistons and cylinders or a cable arrayed over pulleys.

5 Claims, 3 Drawing Sheets

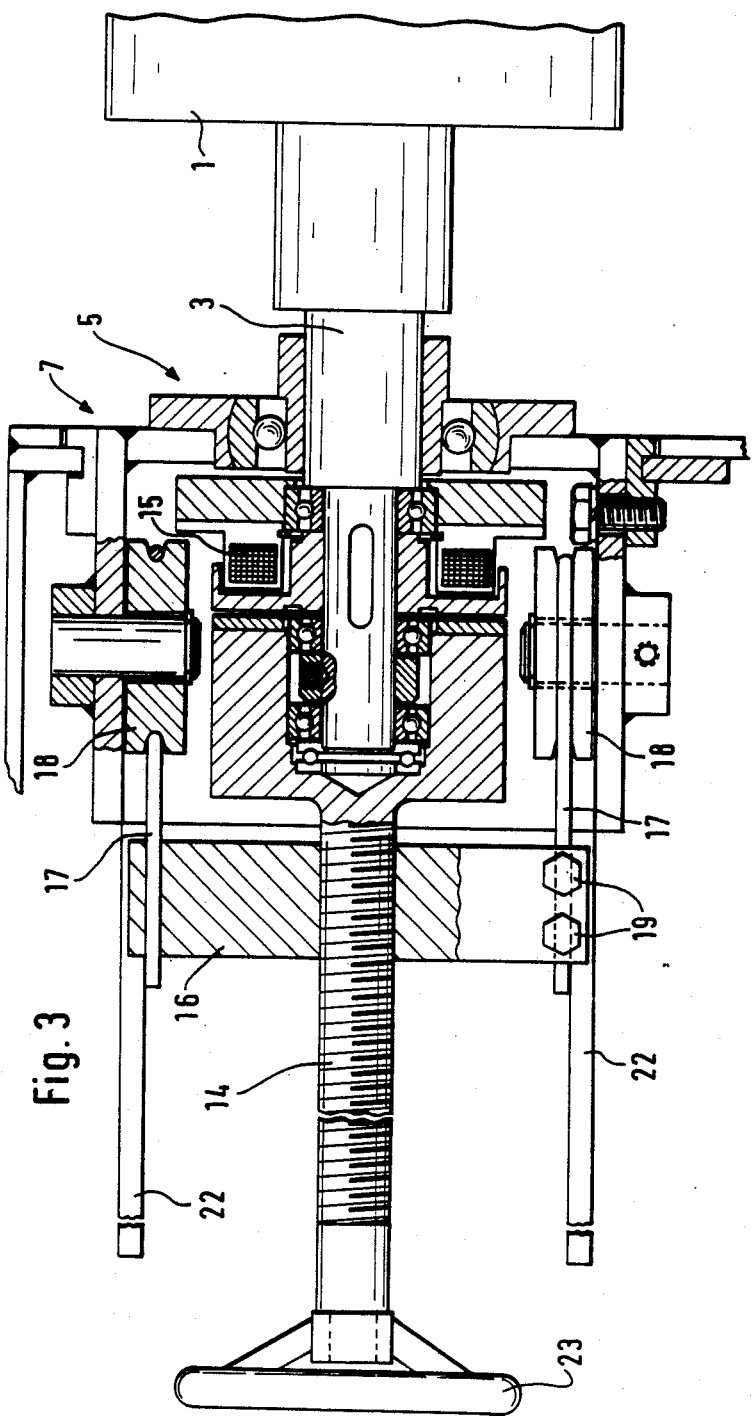

4,921,091

ADJUSTABLE DRAW ROLLER ASSEMBLY

BACKGROUND AND FIELD OF THE INVENTION

This invention relates to a draw roller with two roller bearings each of which are supported by a cantilever displaceable in a frame perpendicular to the longitudinal roller axis.

PRIOR ART

Such draw rollers are generally known and require, in addition to the roller drive, proper further driving means in order to displace the cantilevers along the frame. Since for a parallel displacement of the draw roller both cantilevers must be displaced by an absolutely equal amount, the driving means for the cantilevers of known roller assemblies are particularly complex and considerably increase the cost of draw rollers which must operate in variable positions.

SUMMARY OF THE INVENTION

The invention is based on the task of developing a draw roller of the initially described type so that with the aid of the roller drive in simple manner the cantilevers too can each be displaced by equal amounts with respect to the other so as to assure a parallel displacement of the ends of the draw roller.

The solution of this task is derived by providing a draw roller assembly which includes a frame having parallel tracks carrying the respective shaft bearing assemblies. One bearing assembly carries a motor for driving the shaft, and the other includes height adjusting means including a threaded spindle coupled to a nut shiftable toward and away from the shaft axis. The nut is connected to one end of a pair of parallel spaced cables (the term "cables" to include chains, ropes, etc.) the other end of the cables being secured to an upper portion of the frame. The cables are arrayed over a pulley assembly such that horizontal movements of the nut induce vertical movements of the other bearing assembly.

The spindle carrying cantilever is, therefore, through its own weight and the additional load weight resulting from the draw roller brought to a level whose height is inversely proportional to the cable length between the pulley assembly or deflection roller and the cable ends fixed on the frame. In order to keep the driveside cantilever always on a matching level with the height adjusting cantilever a connecting system links the two bearing assemblies supporting the draw rollers.

According to one embodiment of the invention the connecting system of the cantilevers consists of two cylinder-piston rod units and a line communicating them which is so connected to the units that the cylinder-piston rod unit assigned to one cantilever is acted upon one cylinder side which is opposite to the cylinder side acted upon of the cylinder-piston rod unit assigned to the other cantilever.

Through the opposite action upon the cylinder-piston rod unit with a constant quantity of a incompressible flow medium, for example hydraulic oil, a precisely equal displacement of both cantilevers within the closed connecting system results.

According to a further implementation of the invention the connecting system of the cantilevers consists of a cable guided via pulleys the distal ends of the cable being fixed to the respective cantilever or bearing assemblies.

Through cable attachment and pulley arrangement vertical movements of one bearing assembly result in exactly equal vertical movements of the other.

In order to be able to vertically displace the draw roller in either direction independently of the rotation of the reversible drive during normal operation, the nut is displaceable on the spindle additionally through a handwheel coupled for rotation with the spindle.

During operation the draw roller can, via the motorized drive according to its direction of rotation be lifted or lowered, whereas with the aid of the handwheel the draw roller can also, during the operation be lifted or lowered.

The drive unit comprises preferably a motor mounted on the cantilever and connected to the roller via gearing, and an elastic coupling. The draw roller is rotationally coupled to the threaded spindle preferably by an electromagnetic coupling.

The roller position is consequently changed whenever the motor, via the gearing and the elastic coupling, sets the draw roller into rotation and simultaneously rotates the threaded spindle of the draw roller via the electromagnetic coupling. The position is also changed independently of a rotational motion of the draw roller when the threaded spindle is rotated via the handwheel.

BRIEF DESCRIPTION OF THE DRAWINGS

In the drawings an embodiment example of a draw roller according to the invention is represented wherein:

FIG. 3 is a magnified fragmentary vertical section of the lefthand bearing assembly showing the height adjusting components.

DETAILED DESCRIPTION OF THE DRAWINGS

Figure 1:
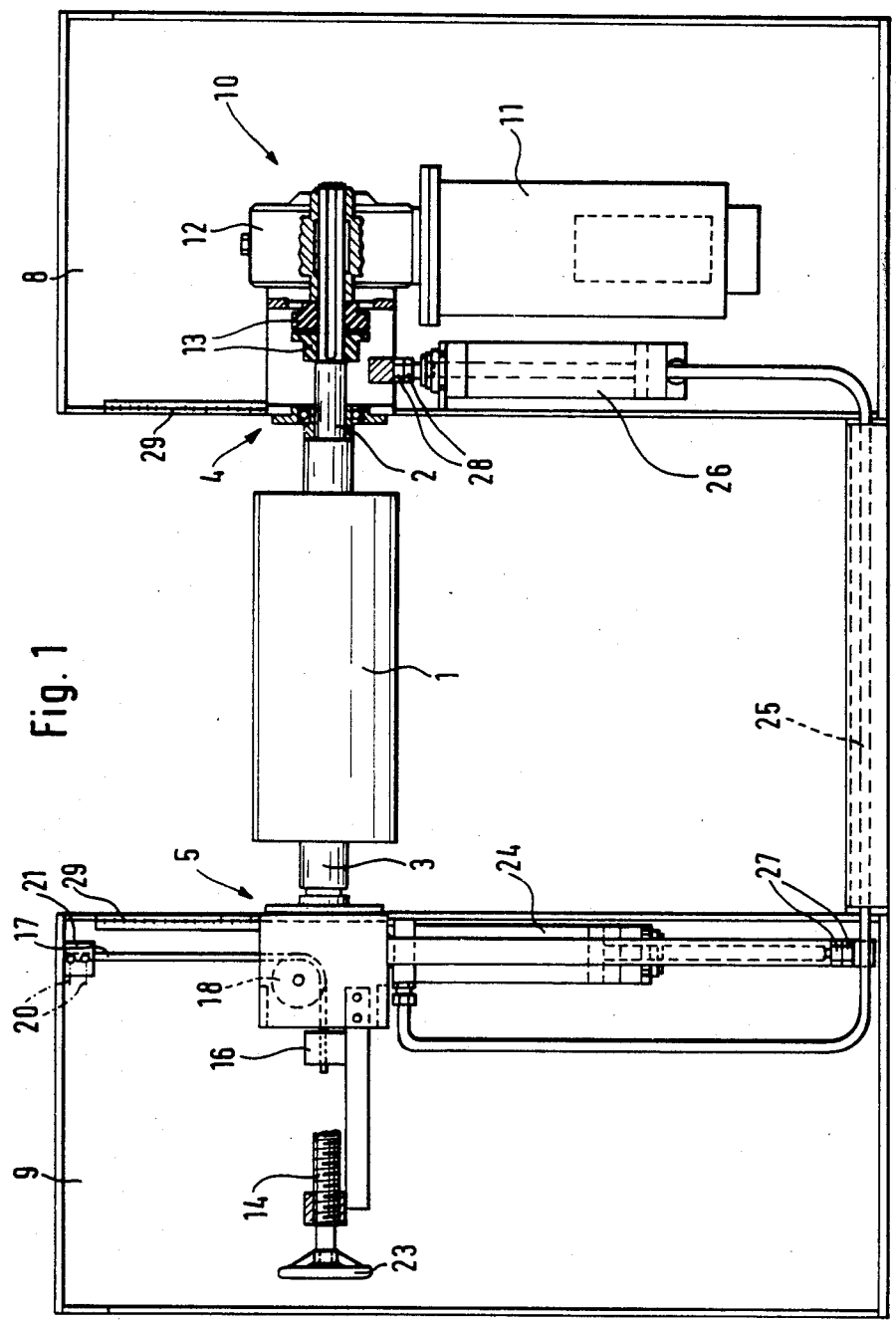
FIG. 1 shows a lateral view of the draw roller and in a vertical section a frame receiving the draw roller.
Figure 2:
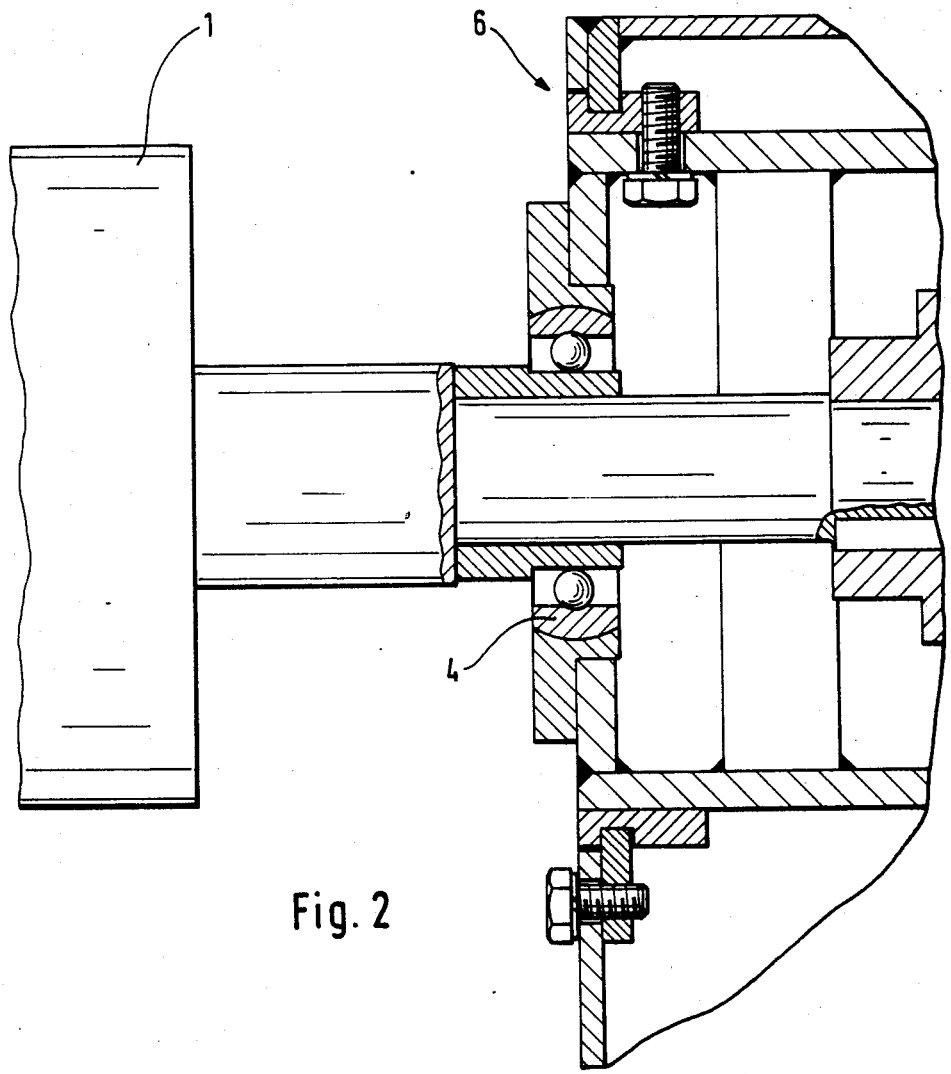
FIG. 2 shows a magnified fragmentary horizontal section of a portion of the bearing assembly supporting the right end of the draw roller.

A draw roller 1 is supported with axle journals 2 and 3 in cantilevers or bearing assembles 4, 5, respectively which are each vertically displaceable on connecting members 6 (FIG. 2) and 7 (FIG. 3). The connecting members 6 and 7 are component parts of right and left vertical components 8 or 9, respectively of a frame.

The axle journal 2 is provided with a driving unit arranged within the frame box 8 which drive unit comprises a motor 11, which is flanged via a gearing 12 on the cantilever 4 with the gearing 12 being connected with the axle journal 2 via an elastic coupling 13.

To the axle journal 2 a threaded spindle 14 arranged within the frame box 9 is assigned which is couplable via an electromagnetic coupling 15 with the axle journal 3. On the threaded spindle 14 a nut 16 is arranged, the nut being secured against rotation. Adjacent opposite margins of the upper surface of the nut 16 are affixed one end of two draw ropes or cables 17. The cables are guided in each instance horizontally from the nut 16 to a deflection roller or pulley 18 supported on the bearing assembly or cantilever 5. The cables 17 are wrapped over the deflection roller or pulley 18 and then extend vertically, the opposite ends of the cables being fixed to an upper portion of the frame box 9. For fixing the ends of the tightly tensed cables 17 screws 19 are threaded into bores at the side margin regions of the nut 16. The upper ends of the cables are secured by screws 20 to a block 21 fastened on the frame box 9. To secure against twisting of the nut 16 two guide bars 22 are provided via which the nut 16 is displaceable horizontally without participating in the rotational motion of the spindle 14.

At the free end of the spindle 14 a hand wheel is fastened whereby the spindle 14 is rotatable when the electro-magnetic coupling 15 is not engaged. Each rotation of spindle 14 leads to a displacement of the nut 16 and thereby to a level displacement of the cantilever 5, since corresponding to the displacement of the nut 16 the ratio of the horizontally and vertically guided portion lengths of the draw ropes 17 change, whereby the cantilever 5 by necessity is lifted or lowered.

The parallel displacement of the draw roller 1, in accordance with a preferred embodiment, takes place via a closed hydraulic system. To this end, on the underside of the bearing assembly 5, the front face of a cylinder of a cylinder-piston rod unit 24 is fastened. To the upper end piece of this unit 24 a line 25 is connected whose other end is connected to a lower end piece of an additional cylinder-piston rod unit 26 whose piston rod presses against the underside of the cantilever or bearing assembly 4.

Through this reciprocal connection of line 25, for example, upon an upward motion of the cantilever 5 with the cylinder of unit 24 an appropriate amount of hydraulic oil is pushed toward unit 26 which due to the identity of the two cylinder-piston units, thereby continuously lifts the cantilever 4 by the same amount as the cantilever 5 is lifted.

By means of counter nuts 27 and 28 on the piston rods of the units 24 or 26 respectively a simple initial adjustment of the connecting system may be effected. As previously noted, a system utilizing a continuous cable the ends of which are affixed to the respective bearing assemblies, 4,5, and the length of which is arranged over appropriate pulleys, may be substituted for the hydraulic system.

From scales 29 attached on sides of the frame boxes 8 and 9 facing each other the particular roller position can be read off.

As will be apparent to those skilled in the art and familiar with the instant disclosure, numerous details of construction may be varied without departing from the spirit of the invention. Accordingly, the invention is to be broadly construed within the scope of the appended claims.

I claim:

1. A driven draw roller assembly comprising a frame having first and second parallel vertically directed supports, first and second roller bearing assemblies mounted on said first and second supports respectively for vertical movement relative thereto, a draw roller having a horizontal shaft the distal ends of which are mounted for rotation in respective said bearing assemblies, drive means on said first bearing assembly operatively connected to said shaft for rotating said roller, height adjustment means on said second bearing assembly, said height adjustment means including a threaded spindle rotatable about an axis co-axial with said shaft, a nut member is threaded engagement with said spindle, said nut member being slidably mounted on said second bearing assembly for horizontal movement toward and away from said roller in response to rotation of said spindle, first and second spaced parallel cable members having lower ends fixed to said nut member and upper ends secured to an anchor portion of said frame above said bearing assemblies, horizontally arrayed pulley means mounted on said second bearing assembly, said cable members including horizontally directed portion extending between said nut member and said pulley means and vertically directed portions extending between said pulley means and said anchor portion, and connecting means linking said first and second bearing assemblies for adjusting the vertical position of said first bearing assembly in accordance with the adjusted position with said second bearing assembly.

2. A draw roller assembly in accordance with claim 1 wherein said connecting means comprises first and second vertically oriented hydraulic piston and cylinder assemblies interposed between said frame and said first and second bearing assemblies respectively, and conduit means connecting said hydraulic assemblies for the transmission of hydraulic fluid therebetween, the connections between said hydraulic assemblies and bearing assemblies being such as to cause vertical movements of said second bearing assembly to cause equal vertical movements of said first bearing assembly.

3. A draw roller assembly in accordance with claim 1 and including electro-magnetic coupling means interposed between said spindle and said shaft of said roller for coupling said spindle for rotation with said roller in the energized condition of said electro-magnetic coupling means.

4. A draw roller assembly in accordance with claim 3 and including a hand wheel fixedly coupled to said spindle.

5. A draw roller assembly in accordance with claim 1 wherein said drive means comprises a motor, gear means connected thereto, and a flexible coupling interposed between said shaft of said roller and said gear means.

* * * * *